Sept. 2, 1958 W. N. MESSIMER 2,849,798
MEANS FOR MEASURING THE DIAMETER OF JOURNALS
OF RAILWAY CAR AXLES
Filed Aug. 12, 1953 2 Sheets-Sheet 1
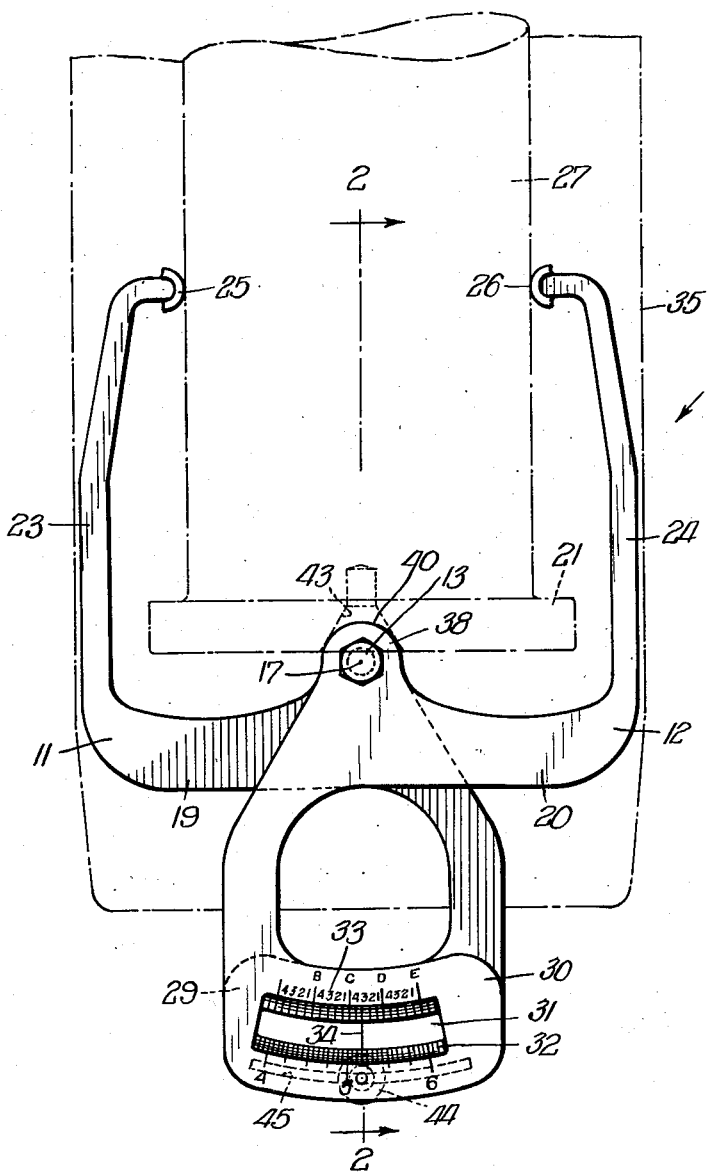
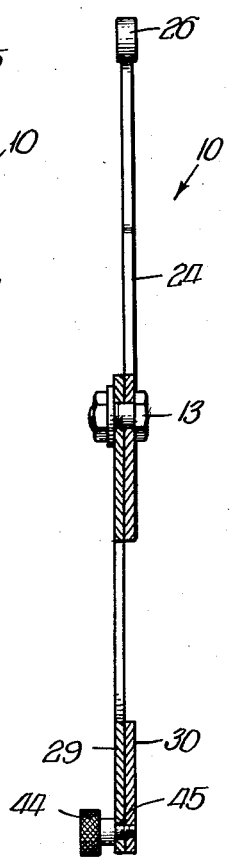
INVENTOR.
Ward N Messimer,
BY
Robert R. Lockwood
atty Sept. 2, 1958 W. N. MESSIMER 2,849,798
MEANS FOR MEASURING THE DIAMETER OF JOURNALS
OF RAILWAY CAR AXLES
Filed Aug. 12, 1953 2 Sheets-Sheet 2

INVENTOR.
Ward N. Messimer,
BY
Robert R. Lockwood
Atty.

United States Patent Office 2,849,798
Patented Sept. 2, 1958

2,849,798

MEANS FOR MEASURING THE DIAMETER OF JOURNALS OF RAILWAY CAR AXLES

Ward N. Messimer, Chicago, Ill.

Application August 12, 1953, Serial No. 373,738

2 Claims. (Cl. 33—148)

This invention relates to a practical, convenient and much needed caliper by means of which the diameters of friction journals of axles of the types commonly used on railway freight and passenger cars can be measured accurately when said journals are in their normal operating position and without removing the journal boxes which enclose them.

It has not been the practice nor has any means been provided or available to measure the diameter of the cylindrical or wearing portion of an axle journal when said journal is located within the journal box. Heretofore, in order to measure the diameter of a journal accurately for the purpose of determining whether it is serviceable or condemnable with respect to prescribed condemning limits or for other purposes, it has been necessary to remove the journal box so that the journal could be reached, observed, calipered or measured by conventional types of calipers, gages, rules or other measuring devices.

It has not been the custom to remove journal boxes for the sole purpose of measuring the journal. Generally they are removed only when defective or when necessary to perform other repairs. Because of this some axles are continued in service after their journals become worn beyond prescribed condemning limits. There is a margin of safety beyond these limits before failure from weakness is imminent but since axle journals are subject to progressive reduction in diameter from wear while in service and since there are no means now available to determine when the condemning limits are exceeded during the period a journal is in continuous use, there lurks the danger that the critical failure point beyond such limits may be reached or too closely approached before it is discovered.

In addition to the desirability of removing axles from service when, through excessive journal wear, their strength is impaired, it is also desirable to avoid lubrication failures which can be accomplished provided the diameters of journals are determined by actually measuring them while in their normal operating position and applying thereto preformed bearings of proper bore diameter to conformably fit the diameter measurement of individual journals. When so fitted the unit pressure on the contacting surfaces between the journal and bearing is kept within reasonable limits for satisfactory lubrication which is not possible when improperly fitted bearings are applied. When the latter condition prevails unit bearing pressures greater than the lubricant can withstand are frequently encountered and the excessive temperature resulting therefrom very often causes the lining metal of the bearing to melt and the bearing to fail completely.

Observations of practices followed by many railroads and studies of records showing the results obtained from them disclose that one of the most critical parts on which satisfactory railway operating performance depends, namely, the friction journal, is given less consideration and attention than is warranted by the fact that it is directly involved in every friction journal lubrication failure.

Periodically the journal boxes and contained parts are given attention which includes operations such as removing journal bearings and wedges for examination and renewal if defective, thoroughly cleaning interior of boxes, and repacking them with freshly processed oil saturated waste packing. The journals are examined for surface imperfections as thoroughly as their limited accessibility inside the journal box will permit. Incidental to these operations, however, there are no specific requirements and it is not the customary practice to measure the dimensions of journals to make sure they are suitable for continued use but on the contrary, after the mandatory requirements prescribed for the other related parts have been complied with, the entire journal box assembly including the journal is presumed to be in suitable condition to give satisfactory service for the succeeding period prescribed by the Association of American Railroads. This period is preesntly fifteen months.

Obviously this practice will not eliminate undersize journals but instead they will continue in use indefinitely unless removed to facilitate repairs to some other part or until they themselves fail and thus bring about their removal. Since the prescribed condemning limits, when exceeded, are assumed to necessitate the removal of journals from service, it follows that, if undersize journals could be measured or detected at the time journal boxes are given periodic attention and at other times, they would be taken out of service in like manner as bearings and wedges are discarded when the examination given them discloses they are defective or beyond the condemning limits.

An important object of the present invention is to overcome this undesirable situation by providing a novel, reliable and convenient gage or caliper to determine the diameter of a journal accurately while it is located within the journal box in its normal operating position. The invention embodies a means whereby the diameter can be read directly in inches and fractions thereof without the use of a separate scale, rule or other device and a means for immediately determining whether or not a journal is undersize and condemnable according to prescribed limits. This invention also embodies a feature whereby the class and group of a journal based on its capacity and diameter can be read directly in terms of a predetermined method of grading journals for bearing fitting purposes as set forth in copending application Serial No. 353,857 filed May 8, 1953, now Patent No. 2,700,208 issued January 25, 1955. This invention facilitates the selection of a correspondingly graded journal bearing for application thereto in order to provide adequate and proper fit between them and thus produce conditions that will greatly improve journal lubrication performance.

In the accompanying drawings which illustrate the gage or caliper embodying this invention and the manner of its application to a journal in order to obtain the diameter dimension, to classify the journal as serviceable or condemnable, and to determine the class or group to which said journal belongs for bearing fitting purposes:

Figure 1 is a top plan view of a gage or caliper constructed in accordance with this invention and showing its application to the journal of a railway car axle which, together with the inside of a journal box, is illustrated by broken lines;

Figure 2 is a horizontal sectional view taken generally along the line 2—2 of Figure 1;

Figure 3:
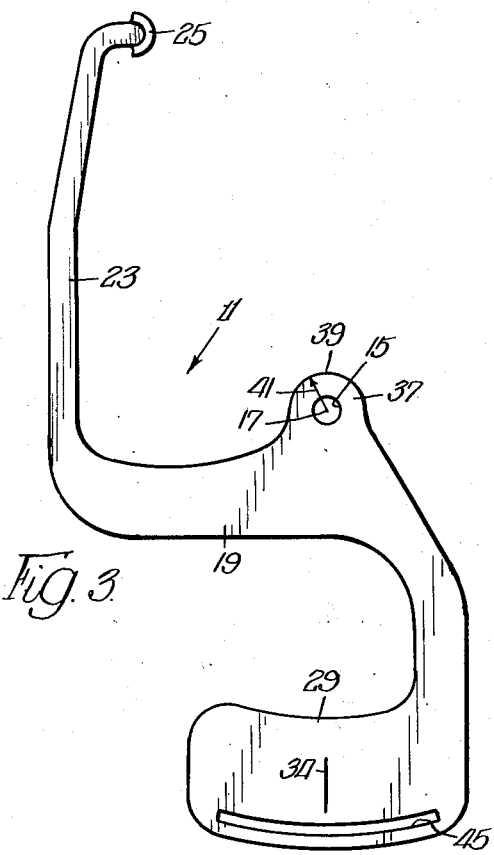
Figure 3 is a top plan view of the lower section or arm of the gage or caliper shown in Figure 1.

Referring more particularly to the drawings, the reference character 10 designates, generally, a gage or caliper which consists of two generally S-shaped main sections or arms 11 and 12. The lower section or arm 11 is pivoted to the upper section or arm 12 approximately at their respective centers by a bolt 13 which extends through clearance holes 15 and 16, Figures 3 and 4. It will be observed that the upper section or arm 12 is positioned reversely to the lower section or arm 11. Preferably the sections or arms 11 and 12 are formed of flat metallic plate material, such as stainless steel. From the common center or pivot axis 17 the sections or arms 11 and 12 extend laterally at 19 and 20 to clear a journal collar 21 and then make approximately a right angle bend and extend forwardly to form fingers 23 and 24 carrying caliper terminating points or shoes 25 and 26 the faces of which are designed to contact a journal 27 of a railway car axle on diametrically opposite sides and relatively close to its center longitudinally. From the pivot axis 17 the two sections or arms 11 and 12 also extend in opposite directions and overlap to form respectively an arcuate indicator portion 29 and an arcuate gage portion 30 which together serve as the handle for the gage or caliper 10. The center curvature of the portions 29 and 30 is coincident with the pivot axis 17. The gage portion 30 contains an arcuate slot 31 the center of which is the pivot axis 17. One side of the slot 31 is provided with graduations 32 representing inches in sixteenths and on the opposite side graduations 33, representing classes and groups of axle journals as disclosed in the application above referred to are inscribed. On the indicator portion 29, an indicator line 34 is inscribed so that it is observable through said slot 31 and its location with respect to the graduations 32 and 33 is directly related to the distance between the caliper points or shoes 25 and 26 at the opposite end of the gage or caliper 10. The graduations 32 and 33 are calibrated with relation to the indicator line 34 and the caliper points or shoes 25 and 26 so that the actual distance between the latter can be read directly from the indicated graduations in the following terms:

(1) Inches and fractions thereof in sixteenths.

(2) Capacity class and diameter group or any other designation in which a journal may be classed under a predetermined system to facilitate proper fitting of bearings.

(3) Axle serviceable or condemnable based on Association of American Railroads journal diameter condemning limits.

In accordance with this invention gages or calipers can be constructed for each Association of American Railroads capacity class of axle or a gage may be constructed to embrace two or more capacity classes of axles. At the present time, there are relatively few axles of 40,000, 60,000 and 200,000 pounds nominal capacity in use and collectively axles of 80,000, 100,00 and 140,000 pound capacities comprise practically all of the friction bearing type axles in general service. For more general application and convenience, therefore, the gage or caliper disclosed herein is constructed so that it can be used particularly on the latter three capacities of axles when within a journal box without any alteration of adjustment. However, there are four illustrated.

Figure 5:
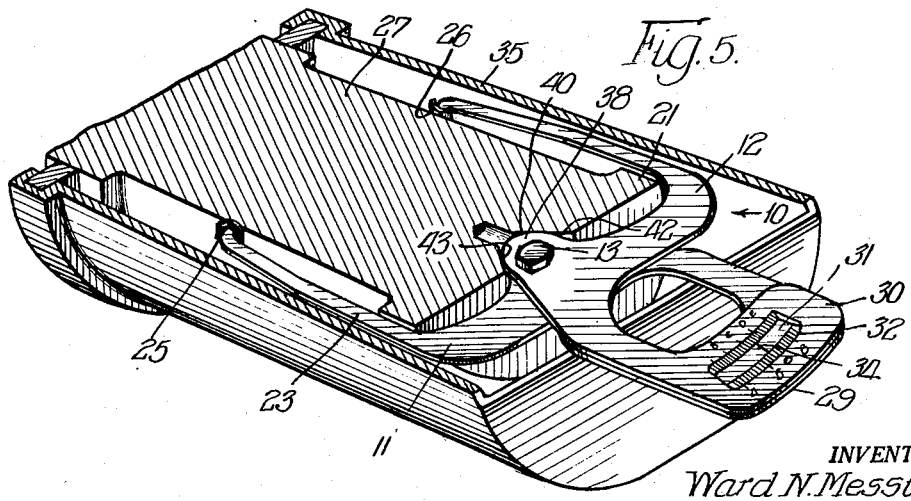
Figure 5 is a perspective view of the gage or caliper illustrated in Figure 1, shown in operative position within a journal box and embracing an axle journal, the latter two being shown in section.

In Figures 1 and 5 the position of the gage or caliper 10 applied to the journal 27 when located within a journal box 35 is illustrated. It will be observed that each of the sections or arms 11 and 12 is provided, respectively, with a centering projection 37 and 38 each having a semi-circular edge 39 and 40 the radii of which are equal and extend from the pivot axis 17 as indicated at 41 and 42. The accuracy with which the gage or caliper 10 measures the diameter of the journal 27 depends upon positioning the points or shoes 25 and 26 at diametrically opposite sides. For this purpose the centering projections 37 and 38 and the pivot axis 17 are located substantially midway between the points or shoes 25 and 26 and the arcuate slot 31. The centering projections 37 and 38 interfit with the outwardly tapered wall of a lathe center hole 43 which is located in the end of every friction bearing journal. Since the edges 39 and 40 of these centering projections 37 and 38 are semi-circular with the center at the pivot axis 17, the gage or caliper 10 remains accurately centered while the sections or arms 11 and 12 are rocked to bring the points or shoes 25 and 26 into proper engagement with the journal 27. Thus, the centering projections 37 and 38 having the semi-circular edges 39 and 40 with their center at the pivot axis 17 provide a means of centering and stabilizing the gage or caliper 10 so that when measuring its diameter a journal always will be calipered perpendicular to and on a plane passing through its longitudinal center line and the dimension thus obtained will be the true diameter. This stabilization and resulting accuracy is accomplished by firmly inserting the centering propections 37 and 38 into the lathe center hole 43 and lightly compressing the handle formed by the portions 29 and 30 until the caliper points or shoes 25 and 26 touch the surface of journal 27 on each side at locations where the greatest measurement is obtained. The pivot center of the sections or arms 11 and 12 and the surfaces of the points or shoes 25 and 26 in engagement with diametrically opposite sides of the journal 27 are then located in a plane passing through the longitudinal center line of journal 27 and, as the caliper points or shoes 25 and 26 are equidistant from said center, a line through the caliper points or shoes 25 and 26 is perpendicular to this longitudinal center line. This centering and stabilizing feature prevents the gage or caliper 10 from becoming canted on the journal 27 and an incorrect measurement being taken. In the design of the gage or caliper 10 herein described, the caliper points or shoes 25 and 26 contact the journal 27 as near to its center longitudinally as is consistent with the variable lengths of journals being measured.

Figure 1 shows the graduations 32 and 33 and the indicator line 34 inscribed on the portions 30 and 29, respectively, as they would be observed when gaging the journal 27. The graduations 32 are calibrated, as stated, so that the dimension indicated by the line 34 is the same as the distance between the caliper points or shoes 25 and 26 in inches and fractions thereof in sixteenths. The graduations 33 are arranged in four groups applicable to axles of 60,000, 80,000, 100,000 and 140,000 pounds capacity and the groups are designated by axle letters B, C, D, and E, respectively, corresponding to the Association of American Railroads axle letters for axles of said capacities. At the right of each group is a graduation identified by the axle letter for said group. When the gage or caliper is properly applied to an axle journal of the capacity corresponding with said group and the graduation identified by its axle letter is in alignment with the indicator line 34, the diameter of the journal being gaged is the same as that specified for a new axle of said capacity. As an example, when the gage or caliper 10 is applied to the journal of a 100,000 pounds capacity and the indicator line 34 is in line with the graduation identified by the letter D, the diameter of the journal is 5.5 inches, the dimension specified for new Association of American Railroad standard axles of 100,000 pounds capacity.

To the left of each graduation identified by an axle letter are four intermediate graduations identified by numerals 1 to 4, inclusive, which represent stages of reduced journal diameter below its diameter when new, caused by wear, machining or other means. In the gage or caliper 10 described herein, each stage represents 0.1 inch of diameter reduction below the next larger diameter and the graduations are identified successively by the numerals 1, 2, 3, and 4 to represent the stages of diameter reduction below the diameter of a new axle journal. As an example, when the gage or caliper 10 is applied to the journal 27 of a used 100,000 pounds capacity axle, and the indicator line 34 is in line with the graduation identified by the numeral 3 within the axle group D, the diameter of the journal is 5.2 inches or 0.3 inch below the dimension of journals specified for New Association of American Railroads standard axles of 100,000 pounds capacity, and when fitting a bearing for application to such a journal, a bearing of corresponding size should be selected.

In describing this invention, a preferred method of identifying the graduations through the use of the Association of American Railroads axle letters, and the numerals 1 to 4, inclusive, and a preferred amount of diameter reduction for each stage, namely 0.100 inch, as provided by the graduations 33 is disclosed. However, it is understood and contemplated that other letters, numerals, characters or symbols and amounts of diameter reduction for each stage can be selected and used without sacrificing any of the advantages or departing from the purpose and intent of this invention.

With further reference to Figure 1 each of the four groups of graduations 33 and designated by axle letters B, C, D and E, respectively, provides for a total amount of diameter reduction of 0.5 inch which corresponds to the amount the diameter of a new journal can be reduced before it is considered too small for further service under existing Association of American Railroads requirements. A journal worn or reduced in diameter to the extent that the indicator line 34 falls below and outside its capacity class identified by its respective axle letter is therefore condemnable.

Figure 4:
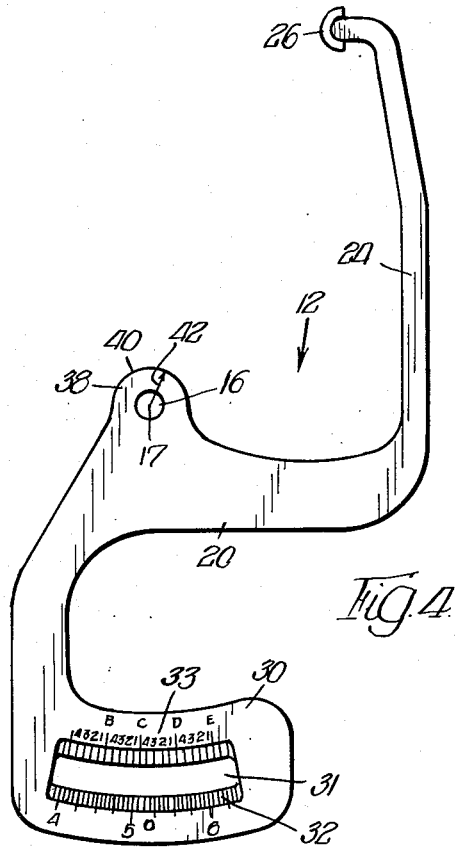
Figure 4 is a top plan view of the upper section or arm of the gage or caliper shown in Figure 1.

A thumb screw clamp 44, Figure 2, extends through an arcuate slot 45 in the indicator portion 29, Figure 3, and is threaded into the gage portion 30. This makes it possible to hold the indicator and gage portions 29 and 30 in fixed position and to remove the caliper 10 from the journal 27 after calipering so that its diameter dimension, class and group designation or whether serviceable or condemnable can be observed and checked subsequently by the user or others or be measured by a separate scale, rule or other device without reference to or use of the graduations 32 and 33 inscribed on the gage portion 30. It also permits the caliper points or shoes 25 and 26 to be set at a desired dimension and the caliper 10 to be used as a check gage or caliper to determine if journals are suitable for reapplication to cars under Association of American Railroads requirements or to check journals for other purposes.

From the foregoing, the need, purpose, development, mode of applying, reading and otherwise using my invention together with its advantages will be readily understood by those versed in the art without a further and more extended description and, while I have disclosed certain preferred means for carrying the invention into practice, it is understood that changes in the means of doing so falling within the scope of the appended claims may be made without departing from the spirit or sacrificing any of the advantages of the invention.

What is claimed as new is:

1. A gage or caliper for measuring the diameter of the journal of a railway car axle having a lathe center hole in the outer end without removing the enclosing journal box comprising, in combination, a pair of fingers for insertion between the inner sides of the journal box and the corresponding diametrically opposite outer sides of the journal, the inner ends of said fingers arranged to engage said outer sides, lateral extensions from the outer ends of said fingers having mutually engaging portions for extending from opposite sides past the lathe center hole, pivot means through said mutually extending portions interconnecting said lateral extensions, similar semi-circular centering projections on said mutually engaging portions for interfitting with the lathe center hole with the mutually engaging surfaces of said portions being coplanar with those portions of said inner ends of said fingers that engage the diametrically opposite outer sides of the journal for measuring the diameter of the journal between the diametrically opposite sides thereof, one of said lateral extensions having an L-shaped extension and the other having a similar extension reversed in position whereby the bottom portions overlap and form a handle whereby the gage or caliper can be inserted endwise into the journal box, and cooperating indicating means on said bottom portions to show the distance between said inner ends of said fingers.

2. A gage or caliper for measuring the diameter of the journal of a railway car axle having at its outer end a radial flange and a lathe center hole without removing the enclosing journal box comprising, in combination, a pair of fingers for insertion past the radial flange between the inner sides of the journal box and the corresponding diametrically opposite outer sides of the journal, the inner ends of said fingers projecting inwardly past the radial flange for engaging the diametrically opposite outer sides of the journal, lateral extensions from the outer ends of said fingers having mutually engaging portions for extending from opposite sides past the lathe center hole, pivot means through said mutually engaging portions interconnecting said lateral extensions, similar semi-circular centering projections on said mutually engaging portions for interfitting with the lathe center hole with the mutually engaging surfaces of said portions being coplanar with those portions of said inner ends of said fingers that engage the diametrically opposite sides of the journal for measuring the diameter of the journal between the diametrically opposite sides thereof, and cooperating indicating means on said lateral extensions to show the distance between said inner ends of said fingers.

References Cited in the file of this patent

UNITED STATES PATENTS

| | | |
|---|---|---|
| 73,126 | Scripture | Jan. 7, 1868 |
| 725,411 | Compliment et al. | Apr. 14, 1903 |
| 1,625,175 | Voigt | Apr. 19, 1927 |
| 1,739,440 | Ciliske | Dec. 10, 1929 |
| 2,048,666 | Beil | July 28, 1936 |
| 2,566,407 | Evans | Sept. 4, 1951 |
| 2,640,273 | Larson | June 2, 1953 |

FOREIGN PATENTS

| | | |
|---|---|---|
| 304,063 | Germany | Feb. 26, 1918 |
| 53,774 | Norway | Apr. 18, 1923 |
| 197,534 | Great Britain | May 17, 1923 |
| 865,954 | France | Mar. 24, 1941 |
| 989,823 | France | May 30, 1951 |